(12) United States Patent
Frew et al.

(10) Patent No.: US 6,824,140 B2
(45) Date of Patent: Nov. 30, 2004

(54) MANWAY COVER GASKET

(76) Inventors: James E. B. Frew, 3905 Hemlock Park Dr., Kingsport, TN (US) 37663; Robert Adam Riggs, 1500 Southcreek Dr., Colonial Heights, VA (US) 23834; Alfred F. Waterland, III, 10910 Lesser Scaup Landing, Chesterfield, VA (US) 23838

( * ) Notice: Subject to any disclaimer, the term of this patent is extended or adjusted under 35 U.S.C. 154(b) by 0 days.

(21) Appl. No.: 10/315,759

(22) Filed: Dec. 10, 2002

(65) Prior Publication Data

US 2004/0108660 A1 Jun. 10, 2004

(51) Int. Cl.[7] .............................................. F16J 15/02
(52) U.S. Cl. ....................... 277/637; 277/651; 277/652
(58) Field of Search ................................. 277/628, 650, 277/651, 652, 637, 626, 627, 630

(56) References Cited

U.S. PATENT DOCUMENTS

| | | | | |
|---|---|---|---|---|
| 3,598,276 A | * | 8/1971 | Brown | 220/831 |
| 3,786,955 A | * | 1/1974 | Mowatt-Larssen | 220/327 |
| 5,195,759 A | * | 3/1993 | Nicholson | 277/652 |
| 5,556,113 A | * | 9/1996 | Amorese et al. | 277/651 |
| 5,558,347 A | * | 9/1996 | Nicholson | 277/652 |
| 5,622,117 A | | 4/1997 | Burian et al. | |
| 5,678,827 A | | 10/1997 | Burian et al. | |
| 6,050,199 A | | 4/2000 | Anderson et al. | |
| 6,076,471 A | | 6/2000 | Burian et al. | |
| 6,092,811 A | * | 7/2000 | Bojarczuk et al. | 277/627 |
| 6,385,919 B1 | * | 5/2002 | McCarthy | 52/169.6 |
| 6,438,907 B1 | * | 8/2002 | McCarthy | 52/169.6 |

* cited by examiner

Primary Examiner—William L. Miller
(74) Attorney, Agent, or Firm—John H. Thomas, P.C.

(57) ABSTRACT

The manway cover has a groove into which a gasket is adapted to be mounted. The groove has an inside diameter. The gasket has an annular metal insert having a top surface and bottom surface, and an inside edge and an outside edge and corresponding inside and outside diameters. A polymer strip is wrapped around and substantially covers the top and bottom surfaces of the metal insert. The polymer strip further has an overlap portion where the polymer strip is folded over and attached to itself, this overlap defining an inside diameter and/or outside diameter of the gasket. The inside diameter of the metal insert is no less than substantially the same as the inside diameter of the manway cover groove. The inside diameter of the gasket is less than the inside diameter of the metal insert.

19 Claims, 4 Drawing Sheets

MANWAY COVER GASKET

The present invention relates to a composite gasket adapted to be inserted into a groove. In one preferred embodiment, the invention is a gasket adapted to be inserted into the groove of a manway cover and securely held therein without the need for mechanical or adhesive attachments. The composite structure of the gasket including an inert polymer wrapped around a metal insert provides for superior sealing of the gasket over multiple uses.

BACKGROUND OF THE INVENTION

Manways are built into many constructions for a broad range of uses. Those uses include, but are not limited to, their use on railway tank cars and other large storage tanks that hold chemicals. These tanks are prevalent throughout the chemical processing, waste treatment, pulp and paper and other industries.

Particularly in railcar manway applications, the gaskets that are used, typically installed in the manway cover, are subjected to substantial abuse. The rail workers themselves may treat the manway cover roughly during loading and unloading operations. Also the contents of the tank may slosh around during transport to come in contact with and corrode the gasket. The conventional method for applying a ring gasket to the manway is to secure it within the groove in the manway cover with an interference fit. Also, once installed, the gasket is often ignored until a leak is discovered, so it will be subject to abuse for extended time periods. With an interference fit type of application, the manway gasket is not mechanically secured into the manway cover groove and can fall into the tank car during opening and closing of the manway cover. When a chemically aggressive product is being shipped, it may attack and degrade (or compound other mechanical damage over time) certain types of gasket material causing resulting leakage. Most polymer-type gaskets are not reusable, because they are too soft and permanently deform once initially compressed. Also, while polymer gaskets can maintain an initial seal, creep and rail car vibration can cause a seal to degrade during long term operation. Gasket creep and rail car vibration will cause the fasteners retaining a manway cover to loosen. This results in a loss of gasket stress and eventually a leak. Additionally, as a manway nozzle becomes worn and pitted through use over time, hard polymer based or conventional sheet materials and metal gaskets alone can not fill the worn and pitted surface to effect a seal.

In the case of railcar manways, updated inspection procedures sometimes require a pressure test of the sealed railcar, so gasket performance has become more demanding. Still further, increased inspections for and fines related to non-accidental releases (leaks) from a railcar has also focused attention on railcar manway gasketing reliance and durability.

Many solutions have been tried to cure the gasket problems noted herein. Soft polymers that make a good seal are not effectively reusable and may fall out of the groove when the manway is open. Durable polymers that are inert to chemicals may be too soft or may have the same problems of soft polymer gaskets only in that they become loose or can crack or distort. Metal gaskets alone are subject to corrosion and are also not stretchable like a polymer, so it can be difficult to install a metal gasket in a groove and keep it there. Composite gaskets have been attempted where a polymer layer is adhered to the face of a metal gasket. A problem with this layer construction occurs when a corrosive material that may be carried in the tank car may attack the adhesive holding the gasket together. Impurity in the tank results as the adhesive may mix with and contaminate the tank contents. Also, the polymer layer may peel off and fall into the tank when the cover is opened if the adhesive is weakened or dissolved. A still further alternative solution was a composite gasket mounted on the manway nozzle (the male edge that is received in the manway cover groove). Despite an effective sandwich construction where the metal portion of that gasket had inert polymer material wrapped around it, these nozzle gaskets were too exposed to physical abuse. The cleaning and filling functions of the rail car are accessed through the manway. Inevitably, there was physical damage to the gasket that prevented it from effectively and reliably being reusable on a consistent basis.

SUMMARY OF THE INVENTION

Accordingly, it is an object of the present invention to overcome the foregoing drawbacks and to provide a durable gasket adapted to be inserted into a manway cover groove. The present invention is a composite gasket that delivers the benefits of both a polymer gasket (inertness), an elastomer gasket (reuse-ability, low bolt load), and a metal gasket (durability, secure containment in groove) while at the same time being protected from potentially corrosive effects of the tank contents.

In one embodiment, a manway cover gasket is adapted to be mounted into a groove in a manway cover. The groove comprises an inside diameter. The gasket comprises an annular rigid insert having a top surface and bottom surface, and an inside edge and an outside edge and corresponding inside and outside diameters. A polymer strip is wrapped around and substantially covers the top and bottom surfaces of the rigid insert. The polymer strip comprises an overlap portion inside the inside diameter of the rigid insert, this overlap defining an inside diameter of the gasket. The inside diameter of the rigid insert is no less than substantially the same as the inside diameter of the manway cover groove, and the inside diameter of the gasket is less than the inside diameter of the rigid insert. The rigid insert may be comprised of stainless steel, and it may be corrugated. The rigid insert may also comprise tabs that extend radially outwardly from the outside diameter of the rigid insert or radially inwardly from the inside diameter of the rigid insert. The polymer strip may be comprised of expanded PTFE. The manway cover groove defines an opening width between the groove inside diameter and groove outside diameter. The opening width of the groove is then less than the width of the groove inside the opening. Further, the width of the gasket may be greater than the opening width of the groove.

In a still further embodiment, a manway cover gasket is adapted to be mounted within a groove in a manway cover. The groove comprises an inside diameter. The gasket comprises an annular rigid insert having a top surface and a bottom surface and an inside edge and outside edge and corresponding inside and outside diameters. Two annular strips of polymer having an inside and an outside diameter are adhered, one on each side, to the rigid insert. The annular strips of polymer substantially cover the top and bottom surfaces of the rigid insert. The inside diameters of the polymer strips are less than the inside diameter of the rigid insert. An overlap portion is formed from the portion of the polymer strips inside the inside diameter of the rigid insert. The inside diameter of the rigid insert is no less than substantially the same as the inside diameter of the manway cover groove. The rigid insert may be comprised of stainless steel and it may be corrugated. The rigid insert may comprise tabs that extend radially outwardly from the outside diameter or radially inwardly from the inside diameter of the rigid insert. The polymer strips may be comprised of expanded PTFE. Further alternatively, the manway cover groove may define an opening width between the groove inside diameter and outside diameter, and the opening width of the groove is less than the width of the groove inside the opening. The width of the gasket may then be greater than the opening width of the groove.

In another embodiment, a manway cover gasket is adapted to be mounted into a groove in a manway cover. The groove comprises an outside diameter. The gasket comprises an annular rigid insert having a top surface and bottom surface, and an inside edge and an outside edge and corresponding inside and outside diameters. A polymer strip is wrapped around and substantially covers the top and bottom surfaces of the rigid insert. The polymer strip comprises an overlap portion outside the outside diameter of the rigid insert wherein the polymer strip defines an outside diameter of the gasket. Further, the outside diameter of the rigid insert is no more than substantially the same as the outside diameter of the manway cover groove, and the outside diameter of the gasket is greater than the outside diameter of the rigid insert.

DETAILED DESCRIPTION

The present invention is a gasket construction that is adapted to be retained in a groove. The gasket has a composite structure where a rigid ring is covered by a polymer strip or strips. The rigid insert, typically metal, contributes integrity, spring action and rigidity to the gasket. The polymer strip or strips are adhered to the ring and surround it, thereby protecting the adhesive bonds from potential corrosion. Additionally, an inside diameter and/or outside diameter flap portion of the gasket is made from the polymer overlap or laminate. The flap portion stretches or flexes enough for the gasket to be installed. The polymer has enough memory that it will contract or expand to maintain the gasket within a groove. The attached figures illustrate a preferred embodiment where a groove is envisioned to be in a manway cover. Of course, based on the teachings herein, the present invention is adapted for use in other installations with other equipment.

Figure 1:
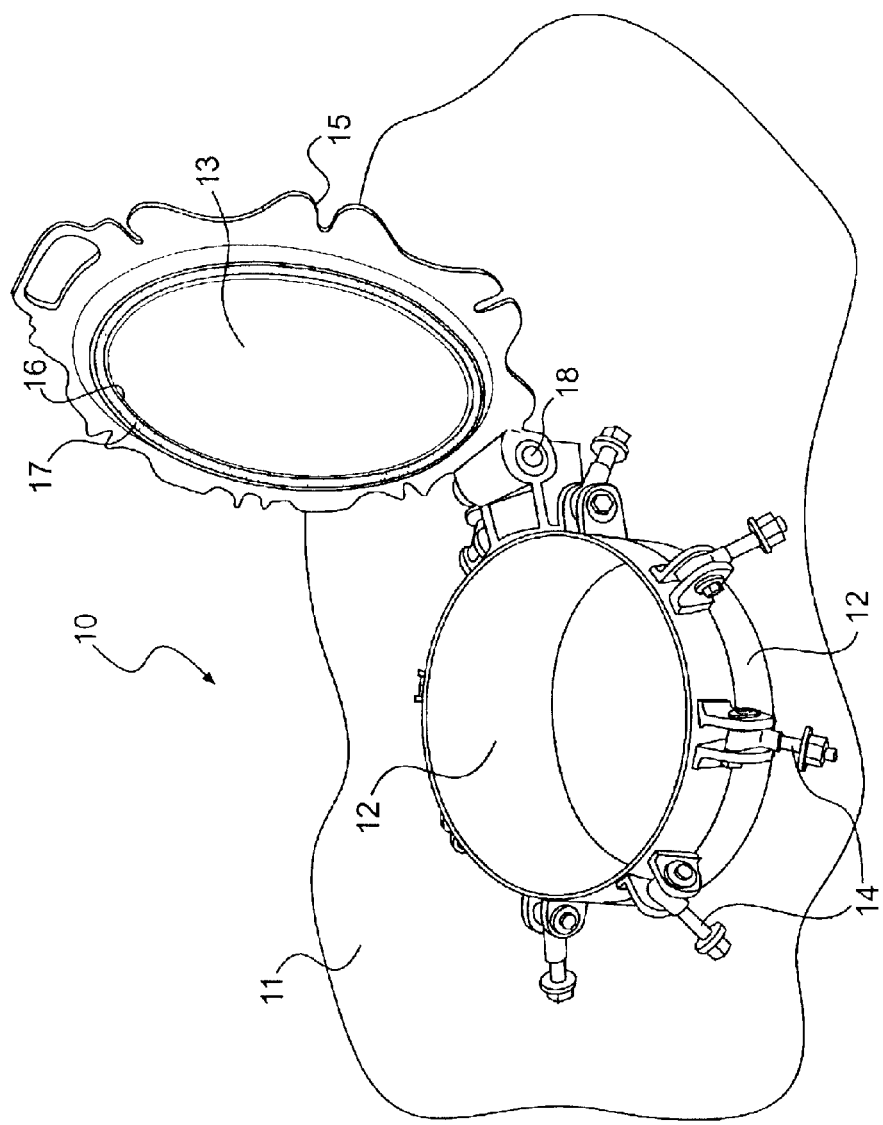
FIG. 1 is a perspective view of a typical manway including manway nozzle and manway cover.

FIG. 1 displays a railcar manway 10 mounted onto a railcar 11. The manway 10 includes a nozzle 12 and cover 13. The nozzle 12 defines a circular axis into the railcar 11. Securement bolts 14 are rotatably mounted along the perimeter of the nozzle 12. The manway cover 13 is connected by a hinge 18 to the nozzle 12. The cover 13 includes securement slots 15 adapted to receive the bolts 14 and lock the cover in the closed position. The cover 13 also includes a groove 16 into which is mounted a gasket 17. The groove 16 is adapted to receive the top edge of the nozzle 12. The gasket 17 is adapted to create a reliable seal between the nozzle 12 and cover 13.

The actual configuration of the groove 16 in a manway cover 13 may vary substantially depending on the manufacturer of the manway cover. FIGS. 5–8 are illustrative of some of the groove configurations found in manway covers. Of course, other groove constructions and variations thereof may be used.

Figure 2:
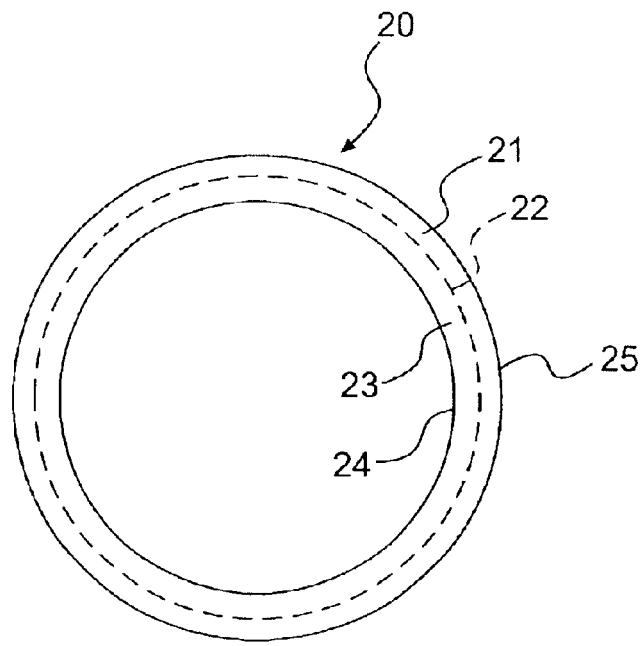
FIG. 2 is a top plan view of a gasket in accordance with a preferred embodiment of the present invention.

FIG. 2 is a top view of a manway cover gasket 20. The gasket 20 is made of an annular rigid insert 21 having an inside diameter defined by the inside edge of edge 22 of the rigid insert. The gasket 20 is further made of one or more strips 23 of polymer material that, along the inside edge 24, define the inside diameter of the gasket 20. The polymer stip 23 may be a single strip folded over onto itself around the rigid insert 21 from inside or outside the insert. Alternatively, the polymer strip 23 may be made up of two strips that are secured together around the rigid insert 21 and to each other on the portion of the gasket inside the inside diameter 22 of the rigid insert 21. The outside diameter of the gasket is defined by the outside edge 25 of the rigid insert 21 and polymer strip 23.

Figure 3:
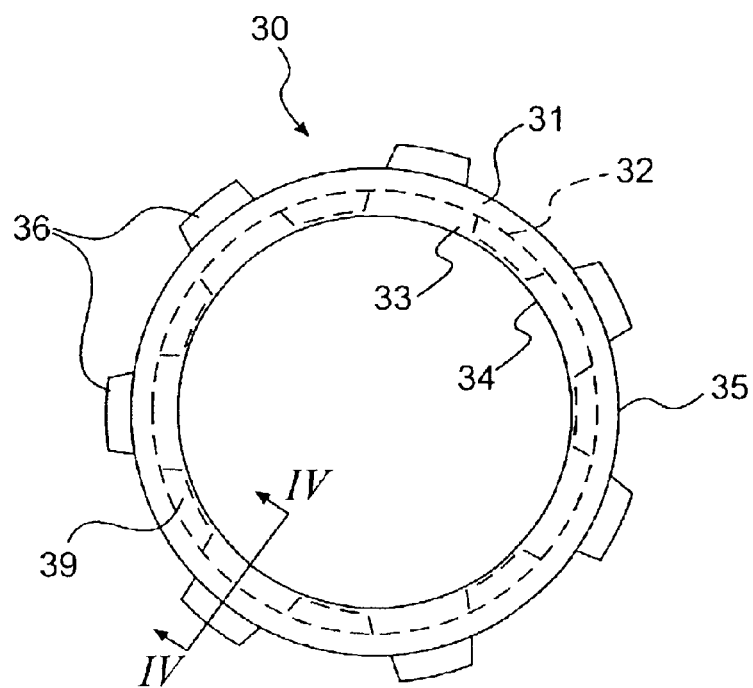
FIG. 3 is a top plan view of an alternative embodiment of a gasket in accordance with the present invention.

FIG. 3 displays an alternative gasket construction 30. This gasket 30 is structurally the same as the gasket 20 described earlier except for the additional tabs 36 and 39 that extend radially outwardly from the outside diameter and radially inwardly from the inside diameter of the rigid insert. Briefly, the gasket 30 is made up of an annular rigid insert 31 having an inside edge 32 that defines the inside diameter of the rigid insert 31. A polymer strip 33 is attached onto the rigid insert 31 and defines an inside edge 34 that is the inside diameter of the gasket 30. The outside edge 35 of the gasket is defined by the outside edge of the rigid insert 31 and/or the polymer strip 33. The tabs 36 and 39 are an integral part of the rigid insert 31. Alternatively, those tabs 36 and 39 may be attached to the rigid insert 31 by adhesive, welding, riveting, etc. If the tabs 36 and 39 are attached to the insert 31, the attachment method must not affect the gasket purpose by creating an uneven or unsealable surface resulting from the attachment method.

Figure 4:
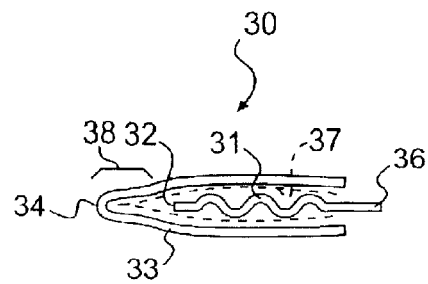
FIG. 4 is a side elevation cross sectional view of a gasket taking along line IV—IV in FIG. 3.

FIG. 4 is a cross section of the gasket 30 taking along line IV—IV in FIG. 3. As is evident from FIG. 4, the insert 31 is a corrugated shape. The inside edge 32 of the insert 31 defines the inside diameter of the insert. The outside diameter tab 36 is shown as an integral part of the insert 31. The polymer strip 33 is shown as a single strip wrapped around both the top and bottom surfaces of the insert 31. An adhesive 37 secures the polymer 33 onto the insert 31. An overlap portion 38 of the polymer strip 33 is adhered to itself. The inside edge 34 of the polymer strip 33 defines the inside diameter of the entire gasket construction.

The insert 31 is preferably made of metal, but hard plastic or composite materials could also be used. The insert 31 is shown as having a corrugated shape. The corrugation is effective during railcar vibration, because it behaves as a spring under compression thus maintaining gasket load during vibration. The corrugation also requires reduced contact area for effective sealing which means lower bolt loads are required for sealing. Preferably, a metal insert is made of 24 gauge stainless steel. Alternatively, it could be made from any suitable metal or alloy material. The cross section or shape of the corrugation may also be subject to any specifications for various manway cover and contents requirements.

The polymer strip 33 is folded over from the inside outwardly to form the overlap portion 38. The strip 33 could have also been folded over from the outside inwardly to form an overlapped 38. As discussed earlier, this could also be made from two annular strips of polymer that are adhered to the top and bottom surfaces of a metal insert 31 and to each other in a comparable overlap portion 38. Preferably, the polymer strip 33 is a single strip so that the overlap portion is folded over onto itself from the inside outwardly and glued to itself. In this way, the inside edge 32 of the metal insert is not exposed from the direction of the inside diameter of the gasket. Also, while preferably glued together, the portions of polymer strip that make up the overlap portion 38 are not necessarily attached to each other. The polymer material that makes up the polymer strip 33 is flexible yet inert to most media. Expanded PTFE or other malleable PTFE is a preferred polymer for this application. It is inert to most media that could be transported within a tank or railcar. Nevertheless, it may be stretched to be mounted within a groove. The polymer has enough memory to contract after stretching so that the inside diameter of the gasket would be less than the inside diameter of a groove after mounting. Of course, other polymers and elastomers could be used.

While the gasket construction shown in the figures including FIG. 4 illustrate the flap portion 38 on the inside diameter of the gasket, it is envisioned that an overlap portion may also be created outside the outside diameter of the rigid insert. In other words, using the same theory of the flap retaining and centering the gasket in the groove, a polymer strip or strips can have an outside diameter that is greater than the outside diameter of a rigid insert. This overlap portion of the polymer strip, therefore, can be engineered to be placed inside the inside diameter of the rigid insert as described earlier, or alternatively, outside the outside diameter of the rigid insert, or both. Specific groove configurations where such an outside diameter flap portion might be particularly applicable include the grooves shown in FIGS. 5 and 7.

Figure 5:
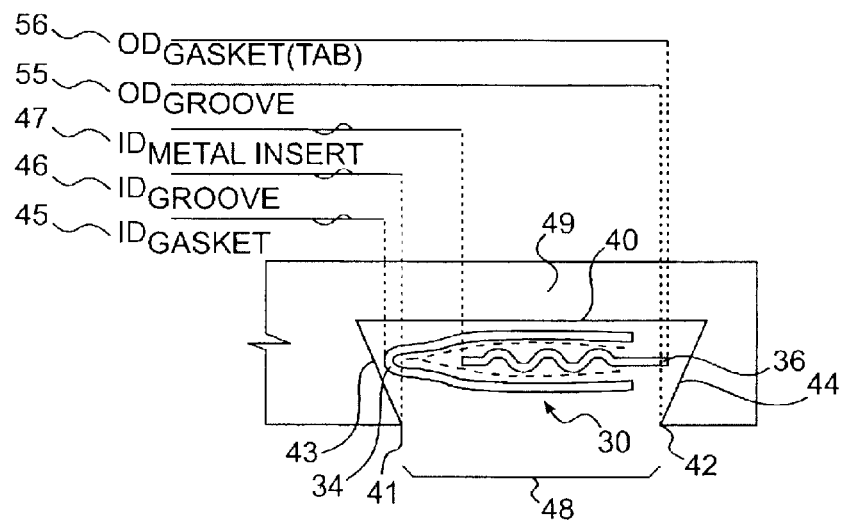
FIGS. 5–8 are side elevation cross sectional views of the gasket shown in FIG. 4 in four different groove configurations.

FIG. 5 illustrates how the gasket 30 is inserted into a manway cover 49, and specifically a manway cover groove 40. The groove 40 has shoulders 41 and 42 that define the opening width 48 of the groove. The sidewalls 43 and 44 of the groove 40 flare outwardly so that the width of the groove increases with the depth of the groove. In accordance with the present invention, the inside diameter 47 of the metal insert 31 is no less than substantially the same as the inside diameter 46 of the groove 40. Yet, the inside diameter 45 of the gasket is no more than, and preferably, less than the inside diameter 46 of the groove 40. During mounting, the overlap portion 38 may be manipulated and stretched around the inside diameter 46 by working it over the inside shoulder 41. Once inside the groove 40, however, the overlap portion 38 will then retain the gasket within the groove, because its inside diameter 45 is less than the inside diameter 46 of the groove. The inside diameter 47 of the metal insert can not be less than substantially the inside diameter 46 of the groove, because the metal insert is rigid and substantially not able to be stretched.

FIG. 5 also demonstrates the interaction of the outside tab 36 of the gasket 30 with the outside portion of the groove 40. The outside diameter 55 of the groove 40, meaning the outside diameter of the opening 48 of the groove, is less than the outside diameter 56 of the metal insert. Specifically in this figure, the tab 36 defines the outside diameter 56. Of course, alternatively, the metal insert 31 does not necessarily require any metal tabs, and it could merely have an outside diameter such as illustrated by the outside diameter 56 in FIG. 5. In any event, because the outside diameter 56 of the metal insert is greater than the outside diameter 55 of the groove, the gasket is retained in place by not only the inside diameter 45 of the gasket but also the outside diameter 56 of the gasket.

Figure 6:
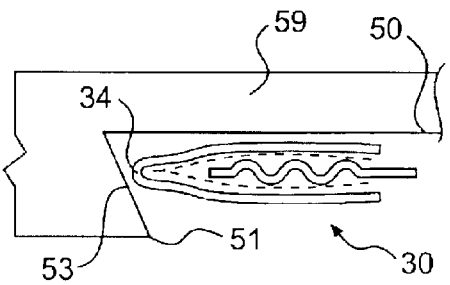

FIG. 6 is a manway cover 59 having an alternative embodiment of a groove construction 50 wherein there is no outside wall to the groove. Instead, an inside shoulder 51 and inside wall 53 retain the gasket 30. Specifically, the overlap portion 38, because its inside diameter is less than the inside diameter of the groove 50, will retain the gasket entirely in place through the interference of that overlap portion with the inside wall 53 of the groove 50.

Figure 7:
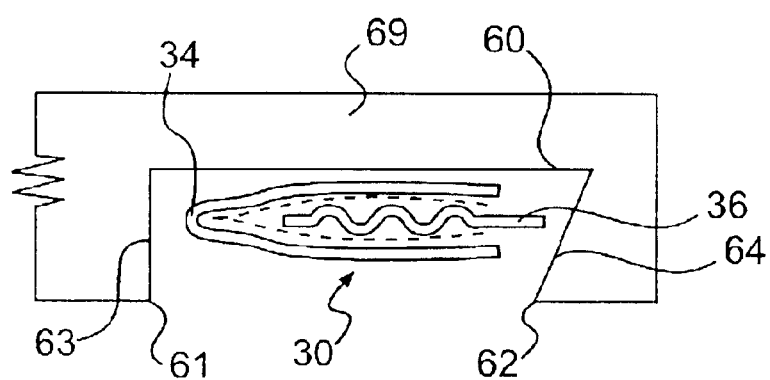

FIG. 7 is a still further embodiment of a manway cover 69 and groove 60. In this configuration, the inside wall 63 of the groove 60 is perpendicular to the inside shoulder 61. The outside wall 64 of the groove 60 flares outwardly from the outside shoulder 62. In this construction, the gasket 30 may be retained in place through an interference fit of the inside edge 34 of the gasket 30 against the inside wall 63. As shown, however, the tab 36 is retained inside the groove 60 through interference fit with the wall 64 that is the outside of the groove 60.

Figure 8:
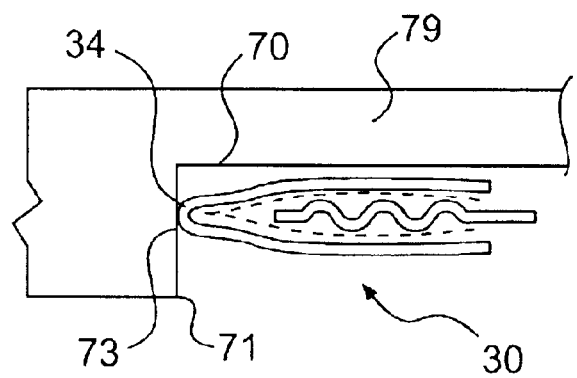

In a still further embodiment, FIG. 8 illustrates a manway cover 79 having a groove 70 that is nothing more than a shoulder 71 and perpendicular wall 73. The gasket 30 is retained in place through interference fit between the inside edge 34 of the gasket 30 and the inside wall 73 of the groove 70.

As shown in FIG. 3, the metal insert 31 may alternatively or additionally have inside diameter tabs 39. These tabs 39 may extend radially inwardly some portion of or all the way to substantially the inside edge 24 of the polymer material 23 as shown. These tabs 39 may further assist with retaining the gasket in a groove as discussed herein. Of course, the spacing and dimensions of these tabs 39 (as well as the outside diameter tabs 36) will depend on groove dimensions as well as the makeup of the gasket and insert. For instance, a gasket having a rigid insert whose inside diameter is substantially equal to the inside diameter of an intended groove cannot have many, large and significantly inwardly projecting tabs, or the gasket will not be able to be mounted in the groove.

In addition to the "retaining" purpose of the overlap flap portion 38 and tabs 36 and 39, these components may also serve and can be engineered to serve a "postioning" function. That is, the radial inward extension of tabs 39 and flap 38 and the radial outward extension of tab 36 can be predetermined so that the corrugated portion of the gasket will receive the top edge of a nozzle to insure maximum gasket performance. Without the positioning function of any one or combination or all three of the overlap flap portion 38 or tabs 36 and 39, the gasket may not seat properly in the groove or be smashed to one side, thus rendering the gasket ineffective.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A manway cover gasket wherein the manway cover comprises a groove into which the gasket is adapted to be mounted, the groove comprising an inside diameter, the gasket comprising:

an annular rigid insert having a top surface and bottom surface, and an inside edge and an outside edge and corresponding inside and outside diameters;

a polymer strip wrapped around and substantially covering the top and bottom surfaces of the rigid insert;

wherein the polymer strip comprises an overlap portion the inside diameter of the rigid insert wherein the polymer strip defines an inside diameter of the gasket;

further wherein the inside diameter of the rigid insert is no less than substantially the same as the inside diameter of the manway cover groove, and the inside diameter of the gasket is less than the inside diameter of the manway cover groove.

2. A gasket as described in claim 1, wherein the rigid insert is comprised of stainless steel.

3. A gasket as described in claim 1, wherein the rigid insert is corrugated.

4. A gasket as described in claim 1, wherein the rigid insert comprises tabs that extend radially outwardly from the outside diameter of the rigid insert.

5. A gasket as described in claim 1, wherein the polymer strip is comprised of expanded PTFE.

6. A gasket as described in claim 1, wherein the manway cover groove defines an opening width between the groove inside diameter and a groove outside diameter, and the opening width of the groove is less than the width of the groove inside the opening;

and the width of the gasket is greater than the opening width of the groove.

7. A gasket as described in claim 6, wherein the rigid insert comprises tabs that extend radially outwardly from the outside diameter of the rigid insert.

8. A gasket as described in claim 1, wherein the rigid insert comprises tabs that extend radially inwardly from the inside diameter of the rigid insert.

9. A gasket as described in claim 1, wherein the polymer strip is folded over from the inside outwardly.

10. A gasket as described in claim 1, wherein the polymer strip is folded over from the outside inwardly.

11. A manway cover gasket wherein the manway cover comprises a groove into which the gasket is adapted to be mounted, the groove comprising an inside diameter, the gasket comprising:

an annular rigid insert having a top surface and a bottom surface, and an inside edge and an outside edge and corresponding inside and outside diameters;

two annular strips of polymer having an inside and an outside diameter, one strip adhered on each side of the rigid insert and substantially covering the top and bottom surfaces of the rigid insert;

wherein the inside diameters of the polymer strips are less than the inside diameter of the rigid insert, and an overlap portion is formed from the portion of the polymer strips inside the inside diameter of the rigid insert;

further wherein the inside diameter of the rigid insert is no less than substantially the same as the inside diameter of the manway cover groove, and the inside diameter of the gasket is less than the inside diameter of the manway cover groove.

12. A gasket as described in claim 11, wherein the rigid insert is comprised of stainless steel.

13. A gasket as described in claim 11, wherein the rigid insert is corrugated.

14. A gasket as described in claim 11, wherein the rigid insert comprises tabs that extend radially outwardly from the outside diameter of the rigid insert.

15. A gasket as described in claim 11, wherein the polymer strips are comprised of expanded PTFE.

16. A gasket as described in claim 11, wherein the manway cover groove defines an opening width between the groove inside diameter and a groove outside diameter, and the opening width of the groove is less than the width of the groove inside the opening;

and the width of the gasket is greater than the opening width of the groove.

17. A gasket as described in claim 16, wherein the rigid insert comprises tabs that extend radially outwardly from the outside diameter of the rigid insert.

18. A gasket as described in claim 11, wherein the rigid insert comprises tabs that extend radially inwardly from the inside diamter of the rigid insert.

19. A manway cover gasket wherein the manway cover comprises a groove into which the gasket is adapted to be mounted, the groove comprising an outside diameter, the gasket comprising:

an annular rigid insert having a top surface and bottom surface, and an inside edge and an outside edge and corresponding inside and outside diameters;

a polymer strip wrapped around and substantially covering the top and bottom surfaces of the rigid insert;

wherein the polymer strip comprises an overlap portion outside the outside diameter of the rigid insert wherein the polymer strip defines an outside diameter of the gasket;

further wherein the outside diameter of the rigid insert is no more than substantially the same as the outside diameter of the manway cover groove, and the outside diameter of the gasket is greater than the outside diameter of the manway cover groove.

* * * * *